United States Patent [19]

Voigt

[11] Patent Number: 4,733,451
[45] Date of Patent: Mar. 29, 1988

[54] METHOD FOR CONSTRUCTING A COMBINATION REAR DUMP AND BOTTOM DUMP TRAILER

[76] Inventor: Wallace D. Voigt, 5448 E. Lupine, Scottsdale, Ariz. 85254

[21] Appl. No.: 856,676

[22] Filed: Apr. 25, 1986

[51] Int. Cl.⁴ .............................................. B60R 27/00
[52] U.S. Cl. ................................. 29/401.1; 29/434; 105/239; 105/260; 296/184; 298/1 R; 298/17.7; 298/27
[58] Field of Search ............... 296/56, 184; 298/26, 298/35 R, 23 TT, 17.7, 24, 27, 1 R; 105/239, 258, 260, 280; 29/401.1, 434

[56] References Cited

U.S. PATENT DOCUMENTS

| | | | |
|---|---|---|---|
| 888,793 | 5/1908 | Enley | 298/35 R |
| 891,963 | 6/1908 | Stafford | 298/35 R |
| 3,552,659 | 1/1971 | Meyer | 298/27 X |
| 3,917,084 | 11/1975 | Swisher, Jr. et al. | 298/27 X |
| 4,348,047 | 9/1982 | Harshman | 296/184 |

Primary Examiner—Robert J. Spar
Assistant Examiner—Janice Krizek
Attorney, Agent, or Firm—John k. Mickevicius

[57] ABSTRACT

The present invention relates to a new type of trailer for trucks used in the construction industry. The invention discloses a combination bottom dump and tail dump trailer in a single unit and a method to build such a unit. The trailer generally comprises a cargo area, a bottom dump hatch in the cargo area, a tailgate door and lifting rams to lift the front of the trailer up to allow cargo to be dumped out the tailgate.

1 Claim, 3 Drawing Figures

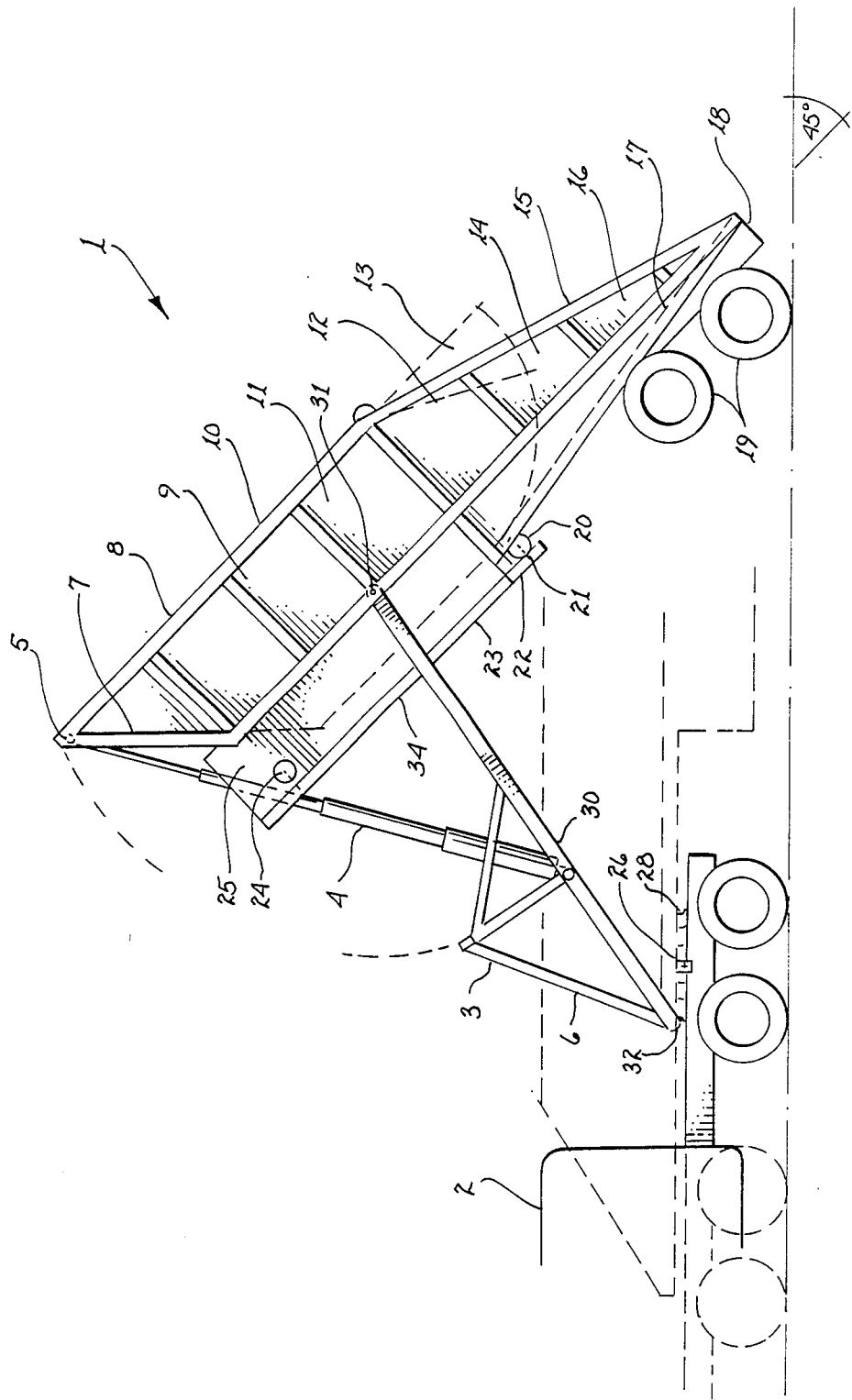

METHOD FOR CONSTRUCTING A COMBINATION REAR DUMP AND BOTTOM DUMP TRAILER

BACKGROUND OF THE INVENTION

1. Field of the Invention

The present invention relates to a new type of trailer for trucks used in the construction industry. The invention discloses a combination bottom dump and tail dump trailer in a single unit and a method to build such a unit.

2. Description of the Prior Art

In hauling heavy construction materials, the type of trailer used to haul such material was heavily dependent on the material and site receiving such material. In the case of finer material such as sand, rocks, dirt or other similar material, a belly dump trailer was required. This is especially true in situations such as road building. This is especially true in situations such as road building, where the material being delivered must be spread out over a relatively long area. However, if the material being delivered is coarse, such as chopped asphalt, large rocks, trees, garbage or other similar material, or if the requirement is to have the material delivered in a single large pile, then a back dump trailer is required.

The typical construction material supplier or trucking firm was therefore required to purchase, keep and maintain both types of trailers to service his entire potential market. This involved expensive duplication of equipment. Many times, a bottom dump would be required, but only a back dump trailer was available. Often, the converse was also true. This resulted in the delay of shipping the requested material to the supplier's customer.

Both types of trailers—back dump and bottom dump—have been known in the art for some time. However, a combination trailer, which would provide much higher utility and which would eliminate costly duplication of delivery trailers, has not been available.

SUMMARY OF THE INVENTION

It is an object of this invention to provide an all purpose trailer for use in the construction industry which can be used for those applications requiring either a tail dump or bottom dump trailer.

It is a further object of this invention to reduce capital outlay required of construction material suppliers.

It is yet another object of this invention to provide a trailer which will have a much higher utilization.

It is a still further object of this invention to provide a method for building such a trailer.

The foregoing and other subjects, features and advantages of this invention will be apparent from the following, more particular, description of the preferred embodiments of this invention, as illustrated in the accompanying drawings.

BRIEF DESCRIPTION OF THE DRAWINGS

FIG. 3 shows yet another embodiment of the disclosed combination trailer in a back dump mode.

DETAILED DESCRIPTION OF THE PREFERRED EMBODIMENT

Figure 1:
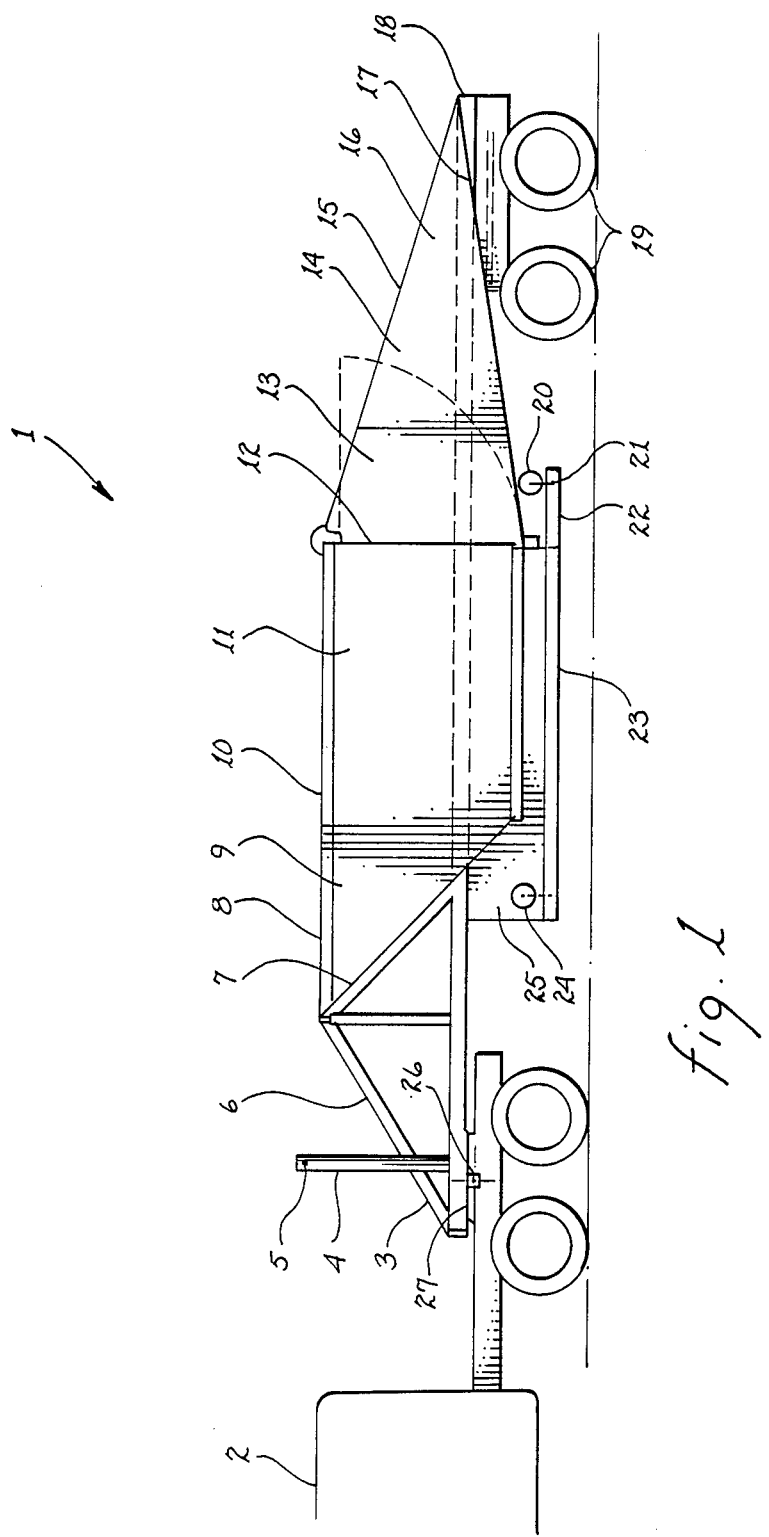
FIG. 1 shows the combination trailer in its normal usage configuration.

Referring now to the drawings and particularly to FIG. 1, there is shown a combination bottom dump and back dump trailer, designated generally by the reference numeral 1. The trailer 1 is generally divided into three sections: a front end section 3, a hopper section 10, and a back end section 15. In a normal position, the front end 3 of trailer 1 is coupled to truck 2 at coupling point 26. One or more lifting rams 4 are also contained in the front end section. The front end section 3 also includes a front frame 6 that is joined to the hopper section 10. The hopper section 10 comprises generally an area to hold the cargo 9, front wall 7, side walls 11 and a tailgate in back of the hopper 12 to keep the cargo (not shown) enclosed while the truck/trailer combination is in motion or otherwise not actually making a delivery of the cargo material. The tailgate swing area 13 must be kept clear so that tailgate 12 can swing open during a back dump delivery. The floor of the cargo area is formed by the bottom doors 23 being closed. The bottom doors 23 are operated by two door rams—a front one 24 and a rear one 20. The bottom doors 23 of the inventive vehicle could not be of the type normally used in the art. Conventional bottom doors as currently known in the art are opened with a pneumatic or hydraulic rams inside the cargo area. These pneumatic or hydraulic rams push open the doors in a clamp-type action allowing the material to fall out. In the instant invention, if the conventional mechanism were used, the rams to push open the bottom doors would be in the cargo area and prevent all the material from falling out in a back dump delivery. The front ram 24 is enclosed in the hopper frame 25 but outside the cargo area 9. The rear door ram 20 is mounted behind the rear portion of the bottom doors 23 so that it would not interfere when cargo is delivered using tail dump mode. In order to reach the rear ram 20, the bottom doors 23 require an extension means 22 to connect to the rear ram 20 at a rear door ram connecting point 21. The back section 15 of the trailer 1 comprises a chute area 14. The chute area 14 comprises a bottom plate 17 and two side walls 16. The back section 15 of the trailer 1 rests on one or more axle and wheel combinations 19 to support the back of the trailer.

The top of the hopper 8 is typically open. Cargo is typically loaded into the cargo area 9 through the open top 8. The tailgate in the back of the hopper section 12 is normally in a closed or down position to keep the cargo contained in the cargo area 9. The tailgate 12 is kept closed and locked while the trailer 1 is in motion by using any one of several tailgate locking methods known in the art today. The bottom of the hopper section contains a bottom dump door 23 which allows discharge of the cargo via the bottom of the hopper. This bottom dump door 23 can be of the clam shell type of any other type common in the art today.

If delivering material requiring a bottom dump, the trailer 1 would be positioned over the area upon which the material is to be dropped. Once in such a position, the bottom door 23 would open using the two bottom door opening rams, 20 and 24. Once the doors 23 are opened, the material (not shown) falls out. As the trailer 1 is pulled forwardly, more material falls out and eventually the cargo area 9 would be empty.

Figure 2:
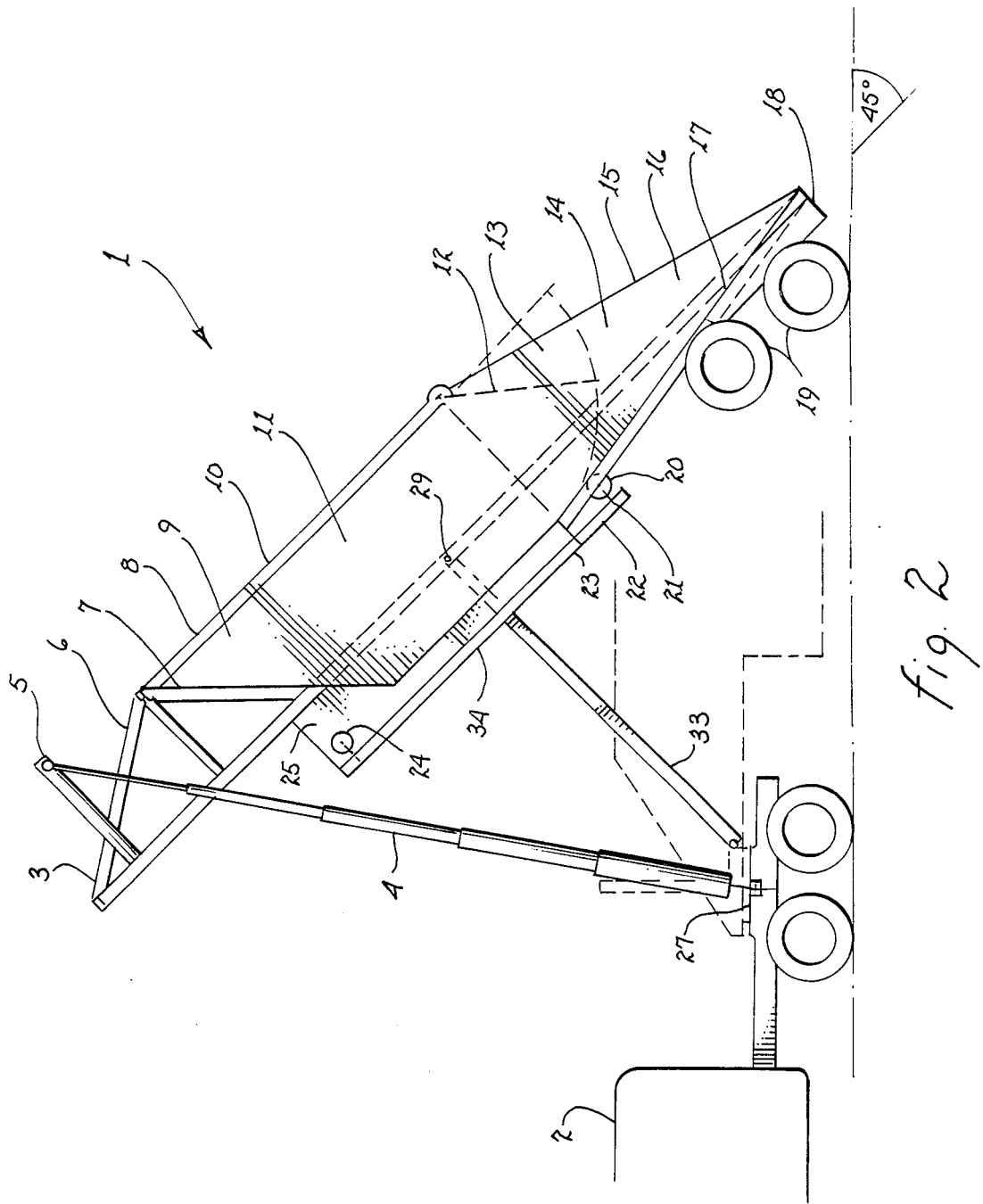
FIG. 2 shows one embodiment of the disclosed combination trailer in a back dump mode.

Referring now to FIG. 2, an embodiment depicting a view of the trailer 1 while it is dumping cargo through the tailgate 12 is shown. In this embodiment, the front frame section 3 is tilted along with the hopper section 10. Stabilizing members 33 are used to connect the front weight bearing area 27 of the truck 2 to the entire elevated section 34. The stabilizing members 33 are coupled to the hopper section 10 at a connecting point 29. There is one lifting ram 4. The lifting ram 4 is connected directly to the front frame at a connecting point 5. At rest, the front frame 3 rests on the retracted lifting ram 4. As the lifting ram 4 elongates pushing the front frame 3 up, the stabilizing members 33 rotate about connecting point 29. The bulk of the weight of the trailer 1 is supported by the lifting ram 4 and rear axle and wheel combination 19.

In a normal rest position, the hydraulic lifting rams 4 are retracted. Thus, the hopper section 10 is resting on the front weight bearing area 27 of the truck 2 and one or more of the axle and wheel assemblies 19. As hydraulic power is applied to the lifting rams 4 forcing them to elongate, the connecting point 5 is forced up, tilting the entire trailer back section of the trailer 1. The rear tailgate 12 would be unlocked prior to tilting the back section of the trailer 1 up. As the trailer back section 15 is forced up, all the weight of the trailer is forced onto the rearmost axle and wheel combination 19. Any materials in the cargo area 9 (materials not shown) would fall out of the trailer and delivery would be complete. Once all material has fallen out, the lifting rams 4 would be retracted and the trailer would return to a normal rest position.

Referring now to FIG. 3, a variation of the preferred embodiment shown in FIG. 2 is presented. The hopper section 10 and rear section 15 form a rigid section 34 which is tilted up to allow the cargo to fall out the tailgate 12. The front frame 6 of the front section 3 has a bottom member 30. This front frame bottom member 30 is joined at one end to the hopper section 10 at connecting point 31. The front frame bottom member 30 is free to rotate about the connecting point 31. The other end of the front frame bottom member 30 is connected to the connecting means 28 connecting the trailer 1 to the truck 2 at the bottom member/truck connecting point 32. The front frame bottom member 30 is free to rotate upwards about the bottom member/truck connecting point 32. One or more lifting rams 4 are connected between the front frame bottom member 30 and a connecting point 5 on the hopper section 10.

In order to manufacture trailer 1, a typical bottom dump trailer is obtained. The lifting ram 4 is installed on the front of the trailer. The back wall of the trailer hopper is adjusted to be vertical and hinges are added so that a top hinge tailgate 12 is formed. The hinges and supports for the bottom dump doors will be moved outboard of the cargo compartment and mounted on the underside of the trailer frame side rails. A chute 14 is formed by installing a bottom member 17 that runs from the bottom rear side of the bottom dump doors 23 rearwardly to the rear most cross member of the back end frame 18. The side walls 16 are added to complete the chute 14 for the material to slide from the tail gate 12.

While the invention has been particularly shown and described in reference to the preferred embodiments thereof, it will be understood by those skilled in the art that changes in form and details may be made without departing from the spirit and scope of the invention.

I claim:

1. A method for providing a combination bottom dump and rear dump trailer apparatus comprising the steps of:

providing a bottom dump trailer, said trailer having a hopper means, bottom door means, bottom door support means and rear frame means, said hopper means of said bottom dump trailer having a rear wall, side walls and a front wall, inside surfaces of said walls and the top surface of said bottom door means forming a cargo area;

installing a lifting means on the front end of said bottom dump trailer;

cutting off said rear wall of said hopper means of said bottom dump trailer;

attaching hinges to the top corners of said rear wall of said hopper means of said bottom dump trailer;

attaching said hinges of said rear wall of said hopper means of said bottom dump trailer to said hopper means of said bottom dump trailer at the top rearmost corners of said hopper means;

removing said bottom door support means of said hopper means from inside said cargo area of said bottom dump trailer;

attaching said bottom door support means of said hopper means of said bottom dump trailer to outside surfaces of said walls of said hopper means of said bottom dump trailer;

attaching a rear frame member laterally across a rearmost portion of said rear frame member of said bottom dump trailer;

connecting said rear frame member and a rearmost portion of said top surface of said bottom door means with a bottom plate means; and thereafter attaching rear side walls means connecting the rear portions of said side walls of said hopper means with said rear frame member and with said bottom plate means.

* * * * *